Nov. 3, 1964 S. MARKOWITZ 3,155,943

MAGNETIC-CORE MEMORY DRIVING SYSTEM

Filed March 9, 1959

INVENTOR.
SEYMOUR MARKOWITZ

BY Lyon & Lyon
ATTORNEYS

United States Patent Office 3,155,943

Patented Nov. 3, 1964

3,155,943

MAGNETIC-CORE MEMORY DRIVING SYSTEM

Seymour Markowitz, Los Angeles, Calif., assignor, by mesne assignments, to Ampex Corporation, Redwood City, Calif., a corporation of California Filed Mar. 9, 1959, Ser. No. 798,166

4 Claims. (Cl. 340—174)

Figure 1:
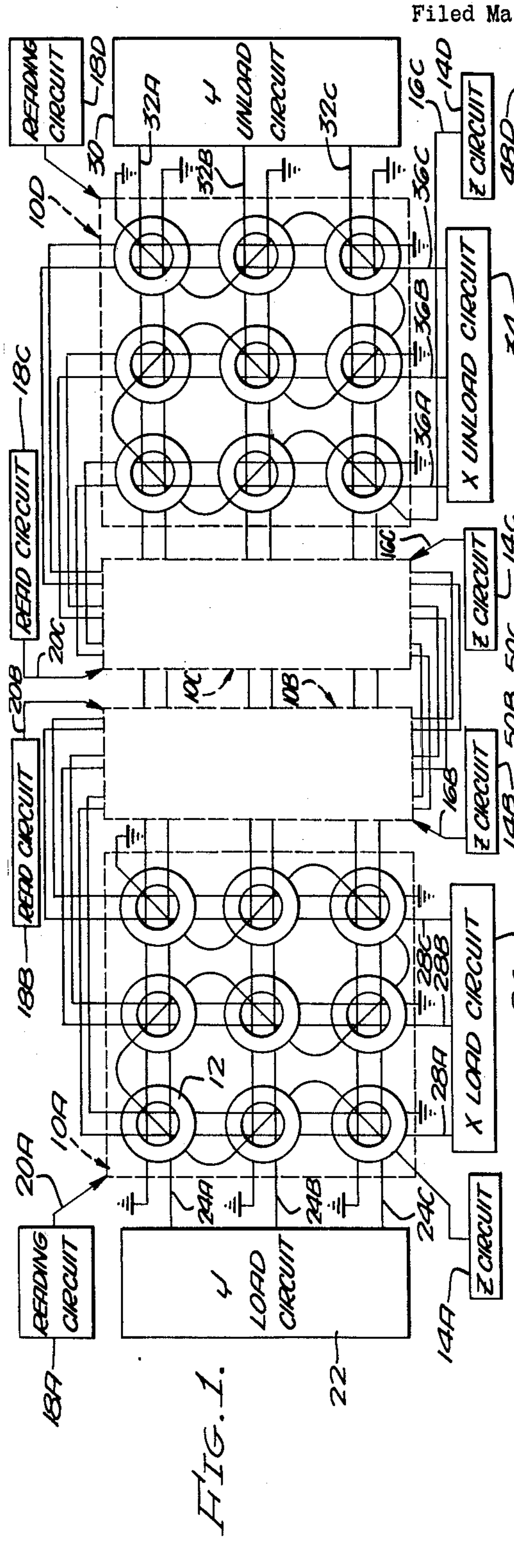

This invention relates to magnetic-core memory systems and, more particularly, to improvements in methods and means for driving magnetic-core memories.

Magnetic-core memories of the type described, for example, in an article in The Proceedings of the IRE for October 1953, page 1407, entitled, "A Myriabit Magnetic-Core Matrix Memory," by Jan A. Rajchman, were originally intended for storing large amounts of data and for providing random access to the stored data. It was soon found, however, that the magnetic-core memory can also be used very efficiently as a buffer memory, or one which is called upon to serve as a temporary storage for information, with the information being transferred into the buffer in batches, and each batch being transferred out of the buffer before a new batch of information is transferred in.

As is well known, the cores selected for storage purposes have perferably substantially rectangular hysteresis characteristics and accordingly have two opposite states of magnetic remanence, respectively designated as the P and N states. These cores are capable of being driven from one state to the other state by having applied thereto a magnetomotive force which exceeds a critical value. The characteristic method of operation employed is to use two drive sources, each providing half the drive required. The cores at which these half drives coincide are the ones which are driven to the desired state of magnetic remanence.

In order to read out the information from the memory, usually the cores are all driven to the same state of remanence, N. The cores that were in P then provide an output, and those that were in N do not provide an output. This affords recognition of the data which was stored in the cores. Thus, since a drive in a first direction for storing information is required to drive cores from N to P, and a drive in an opposite direction is required to drive cores from P to N for readout, it becomes necessary to provide one pair of drive circuits for loading a buffer memory and a second pair of drive circuits for unloading the buffer memory.

Loading drive circuits provide current to driving windings, which flows in one direction for establishing the required P drives, and unloading drive circuits provide current which flows in the opposite direction for providing the required N drives. Regardless of whether the drive circuit components are magnetic cores, tubes, or transistors, in view of the requirement that current flow in opposite directions for reading and writing through the windings coupled to the cores, both a load-drive circuit and an unload-drive circuit are provided for each memory.

An object of this invention is to provide a method and means for operating a magnetic-core memory of the buffer type which uses only a single load unload drive circuit source.

Another object of this invention is to provide a method and means for operating a magnetic-core memory of the buffer type which simplifies its required construction.

Another object of this invention is a method and means for operating a magnetic-core circuit memory which reduces the cost of the construction of such memory.

Yet another object of the present invention is to provide a novel and useful method and means for driving a magnetic-core memory of the buffer type.

These and other objects of the invention are achieved in an arrangement wherein, first, all the cores in the memory are driven to magnetic saturation at one state, P. Thereafter, for loading data into the memory, selected ones of the cores are driven to the opposite state of magnetic saturation, N, while the remaining ones of the cores are maintained in the P state. For reading out the stored data, all the cores are driven to the N state of magnetic saturation, whereby those which were in the P state will provide an output. Prior to the next entry of data, all cores are driven to the P state again.

Figure 2:
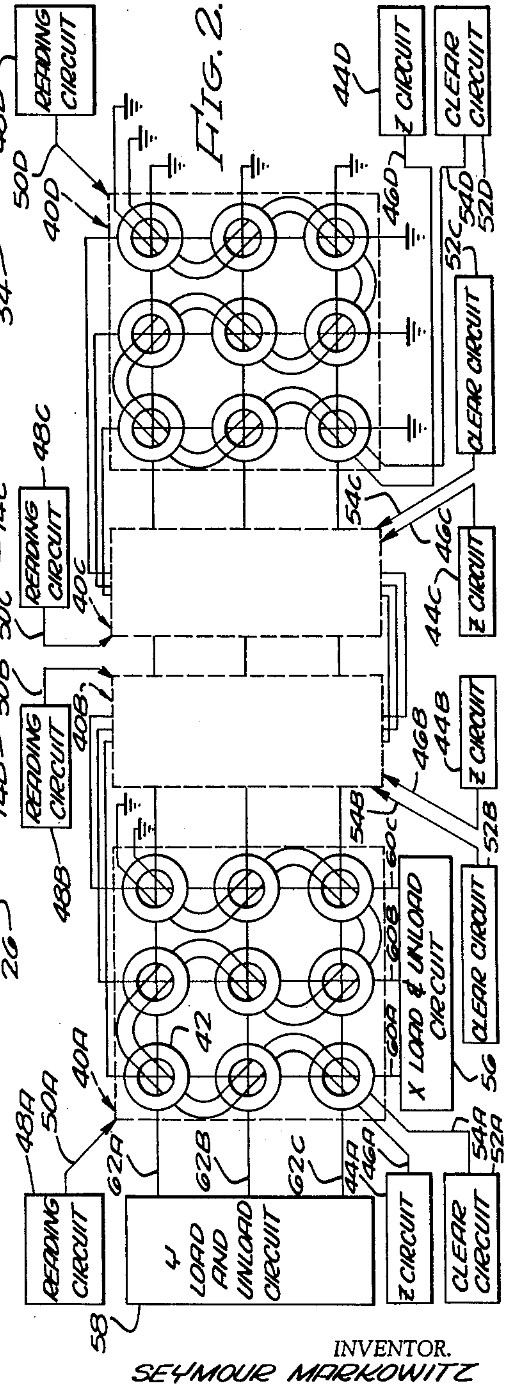

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a known arrangement customarily employed for magnetic-core memories shown to assist in an understanding of the invention; and FIGURE 2 is a block diagram of an embodiment of the invention.

In order to enable a better understanding of the principles of this invention, there is shown in FIGURE 1 a block diagram of a typical magnetic-core memory. To simplify the drawing, the memory will be represented as consisting of four digit planes, respectively 10A, 10B, 10C, and 10D. Each digit plane includes a plurality of magnetic cores 12, arranged in columns and rows. The usual large number of cores in a digit plane is here represented by a 3 x 3 array. The reason for the term "digit plane" being applied to each separate array of cores 10A, 10B, 10C, 10D is because for a data word, which here may comprise four bits, one bit is represented by the condition of magnetic remanence of one core in each digit plane.

Each digit plane has a Z-drive circuit 14A, 14B, 14C, 14D. This circuit applies current to a winding 16A, 16B, 16C, 16D, which is referred to as the digit-plane winding. This winding is inductively coupled to every core in the memory. A reading circuit 18A, 18B, 18C and 18D is also provided for each digit plane. The reading circuit comprises well-known circuitry for amplifying, at the proper time, voltages induced into a winding 20A, 20B, 20C, and 20D in the process of reading. This winding is known as the reading winding and is also coupled to every core in the digit plane with which it is associated. For the purpose of maintaining clarity in the drawings, the threading of the various reading windings on the cores is not shown. A Y-load circuit 22 serves the function of driving a single row of cores in every one of the digit planes. This single row of cores may be selected as desired. The Y-load circuit can apply current to one of the row windings 24A, 24B, 24C for the purpose of half-driving the cores in the selected row towards saturation in the P state. An X-load circuit 26 serves the function of providing half the current required to one of the column windings 28A, 28B, or 28C for driving a column of cores to saturation in the P state of remanence. Note that a similarly positioned row of cores and columns of cores in each digit plane receives the half drives. The one core in each digit plane which receives both column and row half-drives are driven to P.

For those of the selected cores which it is desired to maintain in the N state, an inhibit drive current is applied by the Z circuit to the digit plane winding which is of sufficient amplitude to maintain any selected core in a digit plane in an N state. The Z circuit usually provides half the required magnetomotive force. Therefore, if it is desired to store a word represented by the binary number 1001, then the Z circuits 14B and 14C would provide inhibit current for the respective digit plane winding 16B, 16C and Z circuits 14A and 14D would not provide any inhibit current.

For the purpose of reading out the stored data, the X and Y unload circuits are made to apply the required excitation current to one of the respective column and row windings coupled to the desired core in each one of the digit planes. The unload circuits drive the cores back to the N state, so that those of the cores which were in the P state will provide an output voltage which is induced in the reading coils, and those of the cores in the N state will not provide an output voltage, since they are already in the state in which direction the applied magnetomotive force tends to drive. As a result, a voltage will be induced, for the example given above, in reading windings 20A and 20D, and no voltage will be induced in reading windings 20B and 20C (other than the usual noise voltages).

From the description given, it should be clear that for the purposes of a buffer memory the Y-load circuit and X-load circuit will successively excite the respective row and column windings, and the Z circuits will excite or not the digit plane windings coincident with the X and Y load circuit excitations to store the required data in the memory. When the memory is filled, the readout operation will occur wherein the X and Y unload circuits successively excite the respective column and row windings and restore thereby all the cores not in the N condition to such N condition.

Referring now to FIGURE 2, there may be seen a block diagram of an embodiment of the invention. This will include as before a plurality of digit planes 40A, 40B, 40C and 40D. Each one of these will include the plurality of cores arranged in columns and rows and represented by the reference numeral 42. Each digit plane will have a Z circuit 44A, 44B, 44C, and 44D, which respectively drive digit plane windings 46A, 46B, 46C, and 46D. Each digit plane will also have a reading circuit 48A, 48B, 48C, and 48D, which respectively receive the output induced in the reading coils 50A, 50B, 50C, and 50D.

In accordance with this invention, a clear circuit 52A, 52B, 52C, and 52D may be provided for each one of the digit planes. These clear circuits are coupled to drive a clear-circuit winding 54A, 54B, 54C, and 54D. These clear-circuit windings are wound through the respective digit planes in the same manner as are the Z circuit windings. The purpose of the clear circuits and clear-circuit windings is to reset all the cores in the memory to the P state before a storage operation is to commence. This is known as a clear operation. It is optional as to whether a clear-circuit drive is to be provided for each one of the digit planes separately, or whether one master clear-circuit driver is used to drive the clear-circuit windings of the entire memory.

Also provided in accordance with this invention is an X load and unload circuit driver 56 and a Y load and unload circuit driver 58. These circuits respectively drive the selected column coils 60A, 60B, 60C and row coils 62A, 62B, 62C with one-half the required current drive toward the N state of magnetic saturation. The Y load and unload circuit 58A can selectively drive the row windings 62A, 62B, 62C with one-half the required drive towards saturation at the N state. Regardless of whether it is desired to enter data into the memory or to read out data from the memory, the drives from the X and Y unload circuits are in a direction to position a magnetic core at its N state of magnetic saturation.

The method of operating the embodiment of the invention will now be described. At the outset, a clear operation is required, whereby the clear circuits apply a drive to the clear circuit windings to set all the magnetic cores and all the digit planes in their P state of magnetic saturation. Thereafter, the X and Y load-unload circuits commence to excit coincidentally the column and row coils, applying a current which tends to drive the selected core to which the excited column and row windings are coupled in each digit plane to saturation at the N state. The Z circuits are selectively excited to maintain the cores in the digit planes in the P state of saturation. Thus, in order to store the word 1001 upon the row and column coil excitation by the X and Y load-unload circuits, the Z circuits 44A and 44D would also provide an inhibit current to the respective plane windings 46A and 46D, whereby this result may be achieved.

In order to read out the data stored in the memory, it is merely necessary to again cause the Y load-unload circuit and X load-unload circuit to apply coincident current excitation sequentially to the row and column coils in the memory. Thereby, a drive is applied to the cores in the digit planes which tends to drive them to their N state of saturation. Those cores which were in the P state of saturation will thereupon provide an output voltage to the associated reading winding which will be amplified and interpreted by the reading circuit. Thereafter, it is necessary to again provide a clear operation before data is again stored in the memory.

In order to afford a better comparison of the operations required for a conventional memory as contrasted to those required in accordance with this invention, there follows a comparative table for a load cycle and an unload cycle for both.

| | Conventional Memory | This Invention |
|---|---|---|
| Load Cycle: | | |
| X and Y drives cores to | One | Zero. |
| Z inhibits cores to | Zero | One. |
| Z is applied to store | Zero | One. |
| Unload Cycle: | | |
| X and Y drives cores to | Zero | Zero. |
| Z is not applied | | |
| Clear Cycle | None | One. |

A comparison of FIGURE 1 and FIGURE 2 reveals that by utilizing the method and means of this invention it is possible to eliminate the X and Y unload circuits and also the unload circuit column and row windings. In place of the expensive hardware and the labor of inserting the additional windings, a clear circuit and clear-circuit winding is provided which can consist of a single driver or a driver for each digit plane. The clear-circuit winding can be threaded simultaneously with the Z circuit winding.

Accordingly, there has been described and shown a novel method and means for operating a memory whereby a single set of drive windings can be used for both reading and writing. Thereby, a far simpler and inexpensive memory than those heretofore available is provided.

I claim:

1. The method of operating a magnetic-core memory of the type comprising a plurality of digit planes each of which includes a plurality of magnetic cores arranged in columns and rows and having substantially rectangular hysteresis characteristics with two states of magnetic remanence, each core being capable of being driven from magnetic remanence at one state to magnetic remanence at the opposite state, said method comprising driving all the magnetic cores in all of the digit planes to remanence at said one state prior to storing data therein, applying a drive to remanence at said opposite state to desired similarly positioned cores in all said digit planes while applying a drive to selected ones of said similarly positioned cores to maintain them at said one state of remanence to thereby store desired data, and applying a drive to saturation at said opposite state of remanence to all said similarly positioned cores in all said digit planes for reading out the data stored in said cores.

2. The method of operating a magnetic-core memory of the type comprising a plurality of digit planes each of which includes a plurality of magnetic cores arranged in columns and rows and having substantially rectangular hysteresis characteristics with a P state of magnetic remanence and an N state of magnetic remanence, each core being capable of being driven from remanence in state N to remanence in state P and return, said method comprising driving all the magnetic cores in all of the digit planes to saturation at said P remanence state prior to storing data therein, applying to a desired column of cores in each digit plane one-half of the drive required for driving cores to said N remanence state, simultaneously therewith applying to a desired row of cores in each digit plane one-half of the drive required for driving cores to said N remanence state, simultaneously therewith applying to all the cores in selected ones of said core planes the drive required for maintaining cores in their P remanence state to thereby store desired data in the cores at the intersection of the columns and rows being driven, applying to said desired column of cores in each digit plane one-half the drive required for driving cores to said N remanence state, and simultaneously therewith applying to a desired row of cores in each digit plane one-half of the drive required for driving cores to said N remanence state to thereby read out the data stored at the intersection of the columns and rows being driven.

3. In a magnetic-core memory of the type having a plurality of magnetic cores each of which has substantially rectangular hysteresis characteristics, each core being capable of being driven from a P state magnetic remanence to an N state magnetic remanence and return, data being stored in successive groups of said cores by driving selected ones of the cores in a group to saturation at said P state magnetic remanence while the remaining ones of the cores in a group are maintained in said N state of magnetic remanence, stored data being read from said memory by successively driving all the cores in each of said groups to saturation at said N state of magnetic remanence, the improved method of operating said memory comprising driving all the cores in said magnetic-core memory to said P state of magnetic remanence prior to storage of data therein, driving selected ones of the cores in a group to saturation at said N state of magnetic remanence while the remaining ones of the cores in a group are maintained in said P state of magnetic remanence to thereby store data, and driving all the cores in a group to said N state of magnetic remanence to thereby read out the stored data.

4. The improvement in the method of operating a magnetic-core memory of the type having a plurality of magnetic cores each of which has substantially rectangular hysteresis characteristics, each core being capable of being driven from an N state of magnetic remanence to a P state of magnetic remanence and return, data being stored in successive groups of said cores by simultaneously applying to all of the cores in a group two drives each of half the value required to drive a magnetic core to its P state of magnetic remanence while simultaneously applying to selected ones of the cores in said group a drive of half the value required to drive a magnetic core to its N state of magnetic remanence, and reading the stored data by simultaneously applying to all of the cores in a group two drives each of half the value required to drive a magnetic core to saturation at N state of magnetic remanence, said improvement in the method of operating said magnetic-core memory comprising driving all the cores in said magnetic-core memory to magnetic saturation at said P state of magnetic remanence prior to storage of data therein, storing data in a group of cores by applying to all of the cores in said group two simultaneous drives each of half the value required to drive a magnetic core to saturation at N state of magnetic remanence while simultaneously applying to selected ones of the cores in said group a drive of the value required to maintain a core at its P state of magnetic remanence, and reading the stored data by applying to all the cores of said group two simultaneous drives each of half the value required to drive a magnetic core to its N state of magnetic remanence.

References Cited by the Examiner

UNITED STATES PATENTS

| | | | |
|---|---|---|---|
| 2,700,150 | 1/55 | Wales | 340—166 |
| 2,736,880 | 2/56 | Forrester | 340—166 |
| 2,784,391 | 3/57 | Rajchman | 340—174 |
| 2,843,838 | 7/58 | Abbott | 340—166 |
| 2,915,740 | 12/59 | Ricketts et al. | 340—174 |
| 2,929,050 | 3/60 | Russell | 340—166 |

FOREIGN PATENTS

| | | |
|---|---|---|
| 769,384 | 3/57 | Great Britain. |

IRVING L. SRAGOW, *Primary Examiner.*

E. R. REYNOLDS, JOHN T. BURNS, *Examiners.*